United States Patent [19]

Yasue et al.

[11] Patent Number: 5,725,454
[45] Date of Patent: Mar. 10, 1998

[54] SHIFT CONTROL SYSTEM FOR AUTOMATIC TRANSMISSION

[75] Inventors: Hideki Yasue, Toyota; Hiromichi Kimura, Okazaki, both of Japan

[73] Assignee: Toyota Jidosha Kabushiki Kaisha, Toyota, Japan

[21] Appl. No.: 743,146

[22] Filed: Nov. 4, 1996

[30] Foreign Application Priority Data

Nov. 9, 1995 [JP] Japan .................. 7-290953

[51] Int. Cl.$^6$ .................................. F16H 61/08
[52] U.S. Cl. .................................. 477/155; 475/128
[58] Field of Search .................. 475/117, 120, 475/123, 128; 477/155

[56] References Cited

U.S. PATENT DOCUMENTS 5,050,459  9/1991  Ishikawa et al. .............. 477/155

FOREIGN PATENT DOCUMENTS 5-296337  11/1993  Japan .

Primary Examiner—Dirk Wright
Attorney, Agent, or Firm—Oblon, Spivak, McClelland, Maier & Neustadt, P.C.

[57] ABSTRACT

A shift control system for an automatic transmission to execute a clutch-to-clutch shift by applying a first frictional engagement device and releasing a second frictional engagement device and another shift by applying the first frictional engagement device to cause a rotational change in a predetermined rotary member. At a shift other than the clutch-to-clutch shift, there is detected a stroke time from the feed of an oil pressure to the first frictional engagement device to the start of the engagement. At the clutch-to-clutch shift, the timing for releasing the second frictional engagement device is controlled on the basis of the stroke time.

13 Claims, 10 Drawing Sheets

FIG. 11

| RANGE | GEAR STAGE | C1 | C2 | C3 | B1 | B2 | B3 | F1 | F2 |
|---|---|---|---|---|---|---|---|---|---|
| P | | | | | | | ○ | | |
| R | | | ○ | | | ○ | ○ | | |
| N | | | | | | | ○ | | |
| D | 1ST | ○ | | | | | ○ | ◎ | ◎ |
| | 2ND | ○ | | ○ | | | ○ | | ◎ |
| | 3RD | ○ | ○ | | | | ○ | | ◎ |
| | 4TH | ○ | ○ | ○ | | | | | |
| 2 | 1ST | ○ | | | | | ○ | ◎ | ◎ |
| | 2ND | ○ | | | ○ | | ○ | | ◎ |
| L | 1ST | ○ | | | | ○ | ○ | ◎ | ◎ |

SHIFT CONTROL SYSTEM FOR AUTOMATIC TRANSMISSION

BACKGROUND OF THE INVENTION

1. Field of the Invention

The present invention relates to a control system for an automatic transmission of a vehicle and, more particularly, to a system for controlling the so-called "clutch-to-clutch shift" to apply and release frictional engagement devices simultaneously.

2. Related Art

The ordinary automatic transmission of stage type sets a plurality of gear stages by properly applying/releasing both the clutches of a gear shift unit composed mainly of a plurality of sets of planetary gear mechanisms and frictional engagement devices. At the shifting time of switching the applied/released states of the frictional engagement devices, it is necessary to prevent any shock by smoothing the changes in torque and the number of revolutions. In the prior art, this smooth shift is achieved by applying a one-way clutch to set predetermined medium and low gear stages thereby to apply/release the one-way clutch in accordance with the change in torque.

On the other hand, there is a demand for reducing the size/weight of the automatic transmission. For this demand, it has been tried to achieve a shift as smooth as that of the case using the one-way clutch, by eliminating this one-way clutch to control the oil pressure of the frictional engagement device, as participating in the shift, in accordance with the progress of the shift. In the shift of this kind, as the frictional engagement device to participate in the shift is applied/released, the torque to act upon another frictional engagement devices changes to release/apply the latter frictional engagement devices in accordance with the change in torque. This shift is called the "clutch-to-clutch shift", and one frictional engagement device for this shift is ideally applied/released like the one-way clutch.

Specifically, when both the two frictional engagement devices to participate in the clutch-to-clutch shift lose the torque capacities and come into the so-called "under-lap state", the load to be applied to the engine may drop to cause an overshoot of the engine. On the contrary, when both the two frictional engagement devices take torque capacities more than a predetermined value, the so-called "tie-up" state may be caused to lower the output torque thereby to generate the shock.

At the clutch-to-clutch shift, therefore, the frictional engagement device at the applied side and the frictional engagement device at the released side have to be controlled in an associated manner. For this, there have been proposed a variety of control systems. One example is disclosed in JP-A-5-157167. Specifically, the control system, as disclosed, is equipped with pressure regulating means for controlling the oil pressure of the frictional engagement devices to participate in the clutch-to-clutch shift, on the basis of the input RPM and the input torque. Moreover, this pressure regulating means causes the oil pressure of the applied side frictional engagement device to standby in a low pressure state at the beginning of the shift control and then raises the oil pressure of the applied side frictional engagement device gradually.

In JP-A-5-296337, on the other hand, there is disclosed a system for feeding the oil pressure so abruptly as to cause no delay in the shift when the frictional engagement device to be applied at the shift is to be brought into the standby state under a low pressure. In this system, the oil pressure is raised for the former period of the oil pressure feed and lowered for the latter period. As a result, the shock, which might otherwise follow the change in the oil pressure, can be avoided.

Generally speaking, the clutch-to-clutch shift is executed by releasing the released side frictional engagement device abruptly, simultaneously as the applied side frictional engagement device begins to engage, i.e., to have the torque capacity. This execution is made to prevent the overshoot of the engine due to the underlap or the shock due to the tie-up. For this control, the oil pressure is fed at first to the applied side frictional engagement device, and the oil pressure is drained to release the released side frictional engagement device when the former frictional engagement device begins to engage.

In short, the so-called "grip change" is made on the frictional engagement devices. In this case, what occurs is to interchange the frictional engagement devices to receive the torque, so that the number of revolutions such as the input RPM is unchanged at a substantially constant value. Especially in the case of an upshift according to the clutch-to-clutch shift, the input RPM and the output shaft RPM are kept substantially unchanged without any substantial fluctuation. This makes it impossible to detect the start of engagement of the frictional engagement device on the basis of the detectable operating state such as the RPM. This may cause a time discrepancy in the control of releasing of the released side frictional engagement devices at the clutch-to-clutch shift thereby to invite the shock and the overshoot of the engine.

In order to eliminate such disadvantage, there can be performed the so-called "learning control", in which the oil pressure of the frictional engagement device to participate in the clutch-to-clutch shift is corrected according to the situations of the shock or the engine overshoot at the preceding clutch-to-clutch shift. For this learning control, however, the shock or the engine overshoot has to be caused without fail, thus inviting a disadvantage that the comfortable drive is deteriorated even for a while.

SUMMARY OF THE INVENTION

A main object of the present invention is to smooth the clutch-to-clutch shift to be executed by switching the applied/released states of two frictional engagement elements simultaneously.

Another object of the present invention is to control the release of the released side frictional engagement element properly by accurately deciding the timing of the start of engagement of the frictional engagement element to be applied at the clutch-to-clutch shift.

Still another object of the present invention is to control more accurately the released timing of the frictional engagement element to be released at the clutch-to-clutch shift.

The shift control system according to the present invention is to be applied to an automatic transmission having frictional engagement devices to be applied at the clutch-to-clutch shift and at another shift. For this another shift, the oil pressure is fed to the applied side frictional engagement element, the engagement of which is decided when a rotational change occurs, and the stroke time of this frictional engagement element, i.e., the time period from the start of the oil pressure feed to the start of the engagement is detected. In this case, the pressure of the oil to be fed and the feed duration are kept at predetermined constant values so as to avoid the influences from the throttle opening. Moreover, the line pressure or the initial pressure is kept at a constant level higher than that which is determined on the basis of the throttle opening.

At the clutch-to-clutch shift in which the frictional engagement devices having the stroke time thus determined are applied, the released side frictional engagement element is released when the stroke time elapses from the start of the shift. In short, the release is instructed. As a result, the released side frictional engagement element is released simultaneously with the start of the engagement of the applied side frictional engagement element at the clutch-to-clutch shift. In other words, the frictional engagement element to bear the torque is changed.

Thus, there occurs neither the so-called "tie-up", in which the two frictional engagement devices take torque capacities more than necessary at the same time, nor the under-lap state in which both the frictional engagement devices are released. This prevents the shock and the engine overshoot.

On the other hand, the present invention can be equipped with means for correcting the aforementioned stroke time. Specifically, an unavoidable response delay may be made in the released side frictional engagement element. By correcting the stroke time while anticipating the response delay, therefore, the released side frictional engagement element is released simultaneously with the start of the engagement of the applied side frictional engagement element.

On the other hand, the response delay is caused by the viscosity of the oil when the oil temperature is low. Then, the release of the released side frictional engagement element can be accurately timed by correcting the stroke time on the basis of the oil temperature.

When the oil is left in the applied side frictional engagement element, moreover, the time period from the oil pressure feed to the engagement start of the frictional engagement element is shortened. In the present invention, therefore, when the residual oil is in the applied side frictional engagement element, the stroke time is corrected to change the timing for releasing the released side frictional engagement element. As a result, simultaneously with the start of engagement of one frictional engagement element, the other frictional engagement element can be released to prevent the shock and the engine overshoot at the clutch-to-clutch shift.

The above and further objects and novel features of the present invention will more fully appear from the following detailed description when the same is read with reference to the accompanying drawings. It is to be expressly understood, however, that the drawings are for purpose of illustration only and are not intended as a definition of the limits of the invention.

BRIEF DESCRIPTION OF THE DRAWINGS

FIG. 11 is a diagram showing an application table of frictional engagement devices for setting individual gear stages by the automatic transmission shown in FIG. 5.

DETAILED DESCRIPTION OF THE PREFERRED EMBODIMENT

Figure 5:
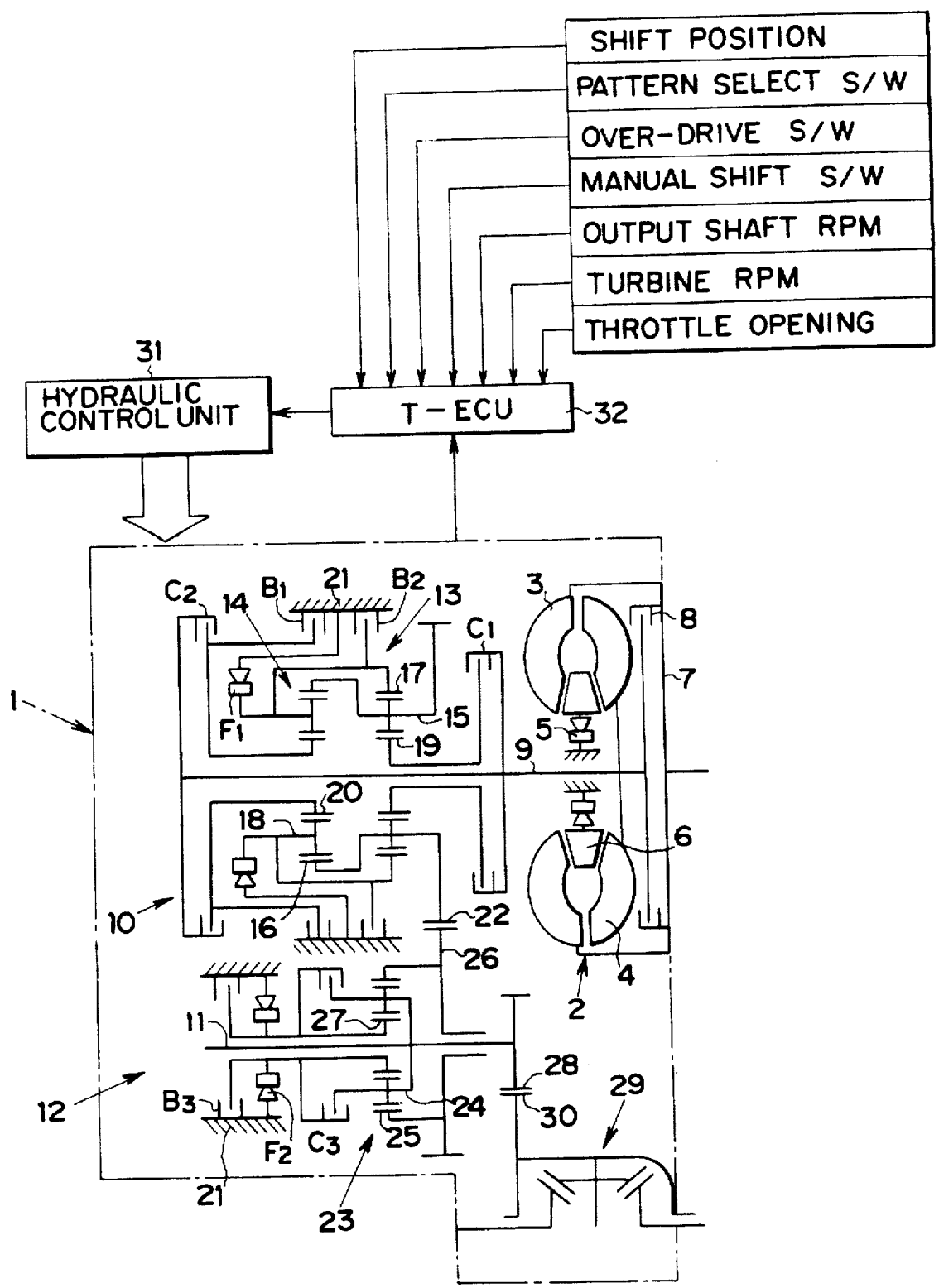
FIG. 5 is a skeleton diagram schematically showing one example of an automatic transmission to which is directed the present invention.

The present invention will be described more specifically with reference to the accompanying drawings. First of all, here will be described one example of an automatic transmission to which is directed the present invention. This automatic transmission, as designated by 1 in FIG. 5, is the so-called "transverse type automatic transmission" which is arranged transversely of a vehicle, and is connected to the (not-shown) engine through a torque converter 2. In this torque converter 2, as in one used generally in the prior art, a turbine runner 4 is arranged in a position opposite to a pump impeller 3 to be rotated by a torque inputted from the engine. Moreover, a starter 6, as retained by a one-way clutch 5, is arranged between those pump impeller 3 and turbine runner 4, and a lockup clutch 8 is arranged between a front cover 7 integrated with the pump impeller 3 and the turbine runner 4. Along the center axis of the torque converter 2, there is arranged an input shaft 9, which is connected to the turbine runner 4.

A first transmission unit 10 is arranged in line with the input shaft 9, and a second transmission unit 12 is arranged in line with a counter shaft 11 which is arranged in parallel with the input shaft 9. The first transmission unit 10 is constructed mainly of a first planetary gear mechanism 13 and a second planetary gear mechanism 14, both of which are of the single pinion type. These planetary gear mechanisms 13 and 14 are arranged so adjacent to each other that the carrier 15 of the first planetary gear mechanism 13, as located at the righthand side of FIG. 5, and the ring gear 16 of the second planetary gear mechanism 14, as located at the lefthand side of FIG. 5, are connected to rotate together, and that the ring gear 17 of the first planetary gear mechanism 13 and the carrier 18 of the second planetary gear mechanism 14 are connected to rotate together.

On the other hand, a first clutch C1 is provided for transmitting the torque of the input shaft 9 selectively to a sun gear 19 of the first planetary gear mechanism 13. This first clutch C1 is arranged between the torque converter 2 and the first planetary gear mechanism 13. A second clutch C2 is further provided for transmitting the torque of the input shaft 9 selectively to the sun gear 20 of the second planetary gear mechanism 14. This second clutch C2 is arranged at the side opposite to (as located at the lefthand side of FIG.5) the first clutch C1 across the individual planetary gear mechanisms 13 and 14.

As brake means, on the other hand, there are provided a first brake B1 for braking the rotation of the sun gear 20 of the second planetary gear mechanism 14 selectively, and a second brake B2 for braking the rotations of the ring gear 17 and the carrier 18, as integrated with each other, selectively. These brakes B1 and B2 are exemplified by the multiple disc type or the band type, and the first brake B1 is arranged between the sun gear 20 and a casing 21 whereas the second brake B2 is arranged between the ring gear 17 or the carrier 18 and the casing 21. In parallel with the second brake B2, moreover, there is arranged a first one-way clutch F1. This first one-way clutch F1 is constructed to be applied, when the integrated ring gear 17 and carrier 18 are to rotate reversely of the input shaft 9, thereby to stop the rotation.

With the carrier 15 of the first planetary gear mechanism 13, moreover, there is integrated a counter drive gear 22, which is arranged between the first planetary gear mechanism 13 and the first clutch C1.

The individual clutches C1 and C2, brakes B1 and B2 and first one-way clutch F1 thus far described are frictional engagement devices in the present invention, which are suitably applied and released in the aforementioned first transmission unit 10 to set one reverse stage and a plurality of forward stages.

Here will be described the second transmission unit 12. This second transmission unit 12 is constructed mainly of a third planetary gear mechanism 23 of the single pinion type, a carrier 24 of which is so connected to the counter shaft 12 as to rotate together and a ring gear 25 of which is integrated with a counter driven gear 26 arranged rotatably in line with the counter shaft 11. Incidentally, this counter driven gear 26 is in meshing engagement with the aforementioned counter drive gear 22.

There is further provided a third clutch C3 for connecting the carrier 24 and a sun gear 27 of the third planetary gear mechanism 23 selectively. Between the sun gear 27 and the casing 21, moreover, there are arranged in parallel a multiple disc or band type third brake B3 and a second one-way clutch F2 both for fixing the sun gear 27 selectively. Incidentally, the second one-way clutch F2 is constructed to engage with the sun gear 27, when this gear 27 is to rotate reversely of the ring gear 25, thereby to stop the rotation of the sun gear 27.

As a result, the second transmission unit 12 is set to an underdrive state, i.e., a low speed stage or a direct connected state, i.e., a high speed stage when the third clutch C3, the third brake B3 or the second one-way clutch F2 is applied.

Incidentally, on the end portion of the counter shaft 11 at the side of the counter driven gear 26, there is mounted an output shaft 28 which is in meshing engagement with the ring gear 30 of a front differential 29 or the final reduction mechanism.

The individual clutches C1, C2 and C3 and individual brakes B1, B2 and B3 thus far described are the frictional engagement devices which are actuated by the oil pressure. There is provided a hydraulic control unit 31 for feeding and releasing the oil pressure to and from those frictional engagement devices. This hydraulic control unit 31 is constructed, as will be described hereinafter, to regulate the line pressure or the original pressure of its entirety, to regulate the oil pressure for switching of the gear stages or for changing the speeds, and to control the application/release of the lockup clutch 8 by solenoid valves.

There is further provided an electronic control unit (T-ECU) 32 for executing the speed change and the pressure regulation by outputting signals to the individual solenoid valves of that hydraulic control unit 31. This electronic control unit 32 is composed mainly of a central processing unit (CPU), a memory unit (RAM and ROM) and an input/output interface. To this electronic control unit 32, there are inputted control signals including a shift position signal, a pattern select switch signal, an overdrive switch signal, a manual shift switch signal, an output shaft RPM signal, a turbine RPM signal and a throttle opening signal. Moreover, this electronic control unit 32 decides the gear stage on the basis of the data inputted and the map stored in advance, outputs an instruction signal to the hydraulic control unit 31 on the basis of an answer of the decision, and executes the regulation of the oil pressure for and at the speed change and the ON/OFF of the lockup clutch 8.

Figure 6:
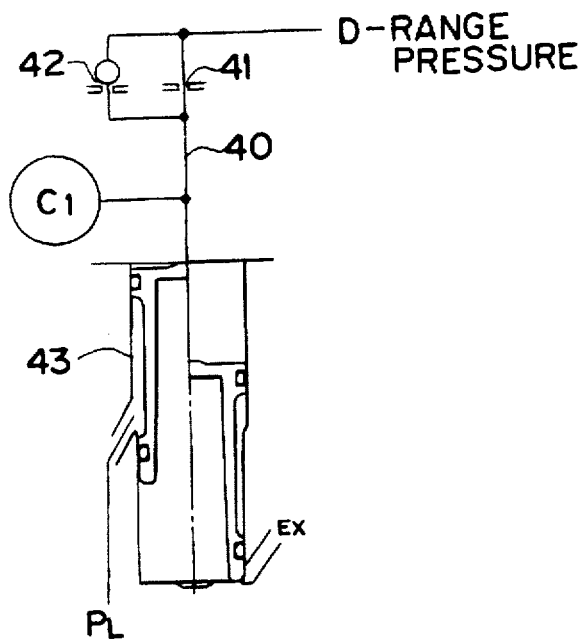
FIG. 6 is a diagram showing such a portion of a hydraulic circuit, as relates to a first clutch.

Here will be described a hydraulic circuit for controlling the application/release of the individual frictional engagement devices. Here will be described at first the first clutch C1. This first clutch C1 is a clutch to be applied at all times when forward gears are to be set. As shown in FIG. 6, therefore, the first clutch C1 is connected through an oil passage 40 to the D-range port of the manual valve (although neither of them is shown). This D-range port outputs the oil pressure even when any range for the forward run is selected, so that the oil pressure is fed to the first clutch C1 by selecting the forward running range. On the other hand, the oil passage 40 is provided with an orifice 41 and a check ball orifice 42 in parallel, to connect an accumulator 43 to the first clutch C1.

Figure 7:
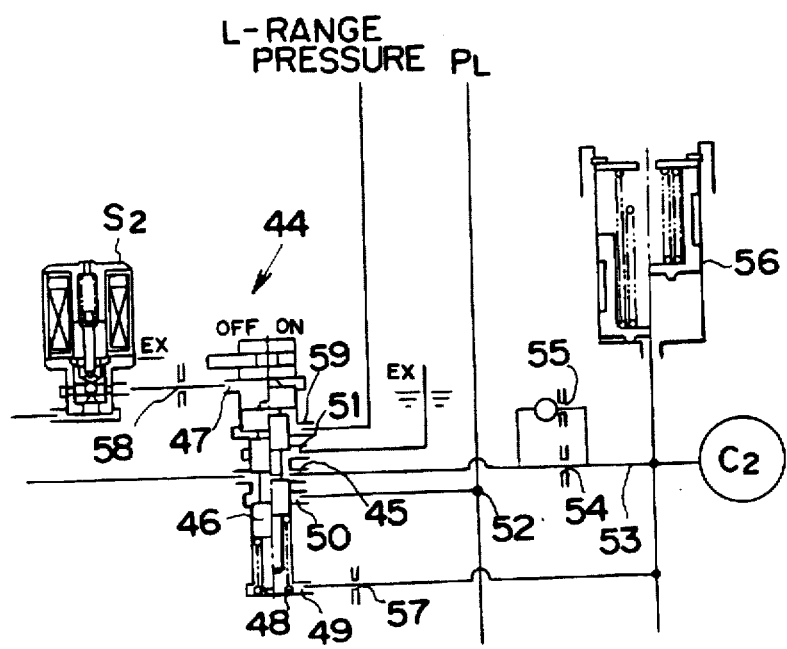
FIG. 7 is a diagram showing such a portion of the hydraulic circuit, as relates to a second clutch.

Here will be described the second clutch C2. As shown in FIG. 7, this second clutch C2 is connected to the output port 45 of a second clutch control valve 44. This second clutch control valve 44 is one to feed and release the oil pressure to and from the second clutch C2 and to regulate the oil pressure, and is constructed to change its oil passages by a spool 46 having three lands. A land, as formed at one end portion of that spool 46, is made to have a larger diameter than those of the other lands, and a control port 47 is opened in the end portion of the larger-diameter land. At the end portion opposite to that control port 47, on the other hand, there is arranged a spring 48 for urging the spool 46 in the axial direction. A feedback port 49 is opened in the portion where the spring 48 is arranged.

On the other hand, the aforementioned output port 45 is formed in the axially intermediate portion, and an input port 50 and a drain port 51 are formed across the output port 45. More specifically, the input port 50 is formed closer to the feedback port 49 than the output port 45, and the drain port 51 is formed at the opposite side. To the input port 50, there is connected a line pressure passage 52, which is fed with the original pressure of the entirety of the hydraulic control unit 31, namely, a line pressure PL regulated according to the throttle opening.

On the other hand, an oil passage 53, as connecting the output port 45 and the second clutch C2,is equipped with an orifice 54 and a check ball orifice 55, which are arranged in parallel with each other. A damper 56 is connected to the oil passage 53 closer to the second clutch C2 than those orifices 54 and 55, and the feedback port 49 is connected through an orifice 57 to the second clutch C2. Incidentally, the damper 56 has a spring-biased piston and absorbs the oil pressure as the piston retracts while compressing the spring, so that it acts to level the oil pressure to be fed to the second clutch C2.

To the aforementioned control port 47, moreover, there is connected through an orifice 58 a second solenoid valve S2 capable of changing the output pressure. This second solenoid valve S2 is a normally open type valve for outputting a signal pressure when it is OFF, and is subjected to a duty control to lower the output pressure as the duty ratio rises. Incidentally, reference numeral 59 designates an L-range port for feeding the L-range pressure which is outputted from the manual valve when the low range for setting the first speed to effect the engine braking is selected.

Specifically, the second clutch control valve 44 functions to hold the balance between the sum of the axial force by the spring 48 and the axial force, as based upon the output pressure acting upon the feedback port 49, and the axial force based upon the signal pressure of the second solenoid valve S2 acting upon the control port 47. As a result, the output pressure is regulated to rise according to the rise in the signal pressure of the second solenoid valve S2. Incidentally, while the signal pressure of the second solenoid valve S2 is considerably high, the spool 46 is held in the position, as shown at the lefthand half of FIG. 7, so that the line pressure is unchangedly fed to the second clutch C2 to bring the second clutch C2 into a completely applied state.

Figure 8:
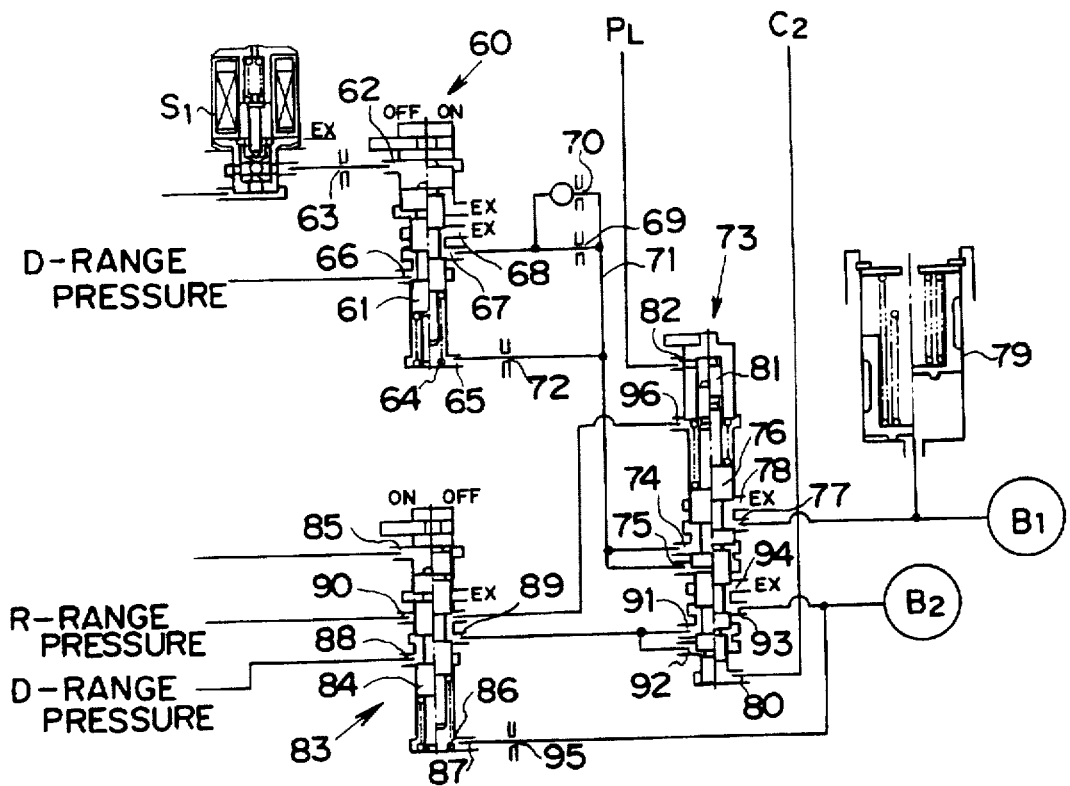
FIG. 8 is a diagram showing such a portion of the hydraulic circuit, as relates to first and second brakes.

The hydraulic circuit for controlling the first brake B1 and the second brake B2 is shown in FIG. 8. A first brake control valve 60 for controlling the oil pressure of the first brake B1 is similar to the aforementioned second clutch control valve 44 and is equipped with a spool 61 having three lands, of which the land at one end portion is made to have a larger diameter than those of the other lands. At the side of the larger-diameter land, there is formed a control port 62, to which is connected through an orifice 63 a first solenoid valve S1 for outputting a signal pressure, when it is OFF, and for lowering its output pressure as it is subjected to a duty control to raise the duty ratio. A spring 64 is arranged at the side opposite to that larger-diameter land, and a feedback port 65 is formed at the end portion where the spring 64 is arranged.

At the axially intermediate portion of the first brake control valve 60, moreover, there are formed an input port 66, an output port 67 and a drain port 68 sequentially in the recited order from the side of the feedback port 65 (or from the lower side of FIG. 8). The input port 66 is fed with the aforementioned D-range pressure. To the output 67, on the other hand, there is connected an oil passage 71 which is equipped with an orifice 69 and a check ball orifice 70 in parallel. To the oil passage 71, moreover, there is connected the aforementioned feedback port 65 through an orifice 72.

In this first brake control valve 60, therefore, the output pressure acts upon the feedback port 65, and the elastic force of the spring 64 additionally acts upward of FIG. 8. On the contrary, the axial force, as based upon the signal pressure of the first solenoid valve S1, acts downward of FIG. 8 so that the output pressure is regulated to balance those axial forces. If the signal pressure of the first solenoid valve S1 exceeds a predetermined level, the spool 61 is held in the position, as shown at the lefthand half of FIG. 8, so that the D-range pressure is unchangedly outputted to the oil passage 71.

The oil passage 71, as connected to the output port 67 of the first brake control valve 60, is connected to a first input port 74 of a fail-safe valve 73 and a first signal pressure port 75 adjacent to the former port. This fail-safe valve 73 is equipped with a spool 76 having two larger-diameter lands, two intermediate-diameter lands, and one smaller-diameter land. These lands are formed sequentially in the recited order downward of FIG. 8, and the first signal pressure port 75 is opened between one larger-diameter land and an adjacent intermediate-diameter land. As a result, the oil pressure, as fed to the first signal pressure port 74, pushes the spool 76 upward of FIG. 8.

Above the first input port 74, as viewed in FIG. 8, there are formed a first output port 77 and a drain port 78 sequentially in the recited order so that the first output port 77 is selectively connected to the first input port 74 and the drain port 78. To the first output port 77, moreover, there are connected the first brake B1 and a damper 79.

In the end portion, as located at the side of the smaller-diameter land, of the spool 76 of the fail-safe valve 73, there is formed a control port 80, to which is fed the oil pressure of the second clutch C2. At the opposite end portion, on the other hand, there is arranged a plunger 81, and a control port 82, as formed at the end portion of the plunger 81, is fed with the line pressure PL.

Here will be described a second brake control valve 83 for controlling the second brake B2. This second brake control valve 83 is equipped with a spool 84 having three lands of the same external diameter. A control port 85, as formed at one end side of the spool 84, is fed with the output signal pressure of the (not-shown) linear solenoid valve for the lockup clutch 8. A spring 86 is arranged at the end portion opposite to the control port 85, and a feedback port 87 is opened in the portion where the spring 86 is arranged.

At the axially intermediate portion of the second brake control valve 83, on the other hand, there are formed a D-range pressure input port 88, an output port 89 and an R-range pressure input port 90 sequentially in the recited order from the feedback port 87. This D-range pressure input port 88 is fed with the aforementioned D-range pressure, and the R-range pressure input port 90 is fed with the R-range pressure which is outputted from the manual valve when the reverse (R) range is selected.

The output port 89 of the second brake control valve 83 is connected to a second input port 91 and a second signal pressure port 92 in the aforementioned fail-safe valve 73. The second signal pressure port 92 is opened between the smaller-diameter land and the intermediate-diameter land adjacent to the former, so that the oil pressure acting thereon produces the axial direction to push the spool 76 upward of FIG. 8. Between the second input port 91 and the aforementioned first signal pressure port 75, on the other hand, there are formed a second output port 93 and a drain port 94 sequentially in the recited order upward of FIG. 8. The second brake B2 is connected to the second output port 93, which is connected through an orifice 95 to the feedback port 87 so as to apply the oil pressure of the second brake B2 to the feedback port 87.

Between the spool 76 and the plunger 81 in the fail-safe port 73, there is opened a third signal pressure port 96, to which is connected the aforementioned R-range pressure input port 90.

As a result, while the spool 76 in the fail-safe valve 73 is depressed to the position, as shown at the lefthand half of FIG. 8, the communication is established between the second input port 91 and the second output port 93 so that the oil pressure, as regulated by the second brake control valve 83, is fed to the second brake B2. In the second brake control valve 83, moreover, the second brake pressure or the output pressure is applied to the feedback port 87 so that a pressure regulating action like that of the aforementioned second clutch control valve 44 or first brake control valve 60 is established to set the output pressure in accordance with the pressure applied to the control port 85. Incidentally, if the oil pressure to act upon the control port 85 is over a predetermined level, the spool 84 is held in the position, as shown at the lefthand half of FIG. 8, so that the D-range pressure is outputted as it is.

Figure 9:
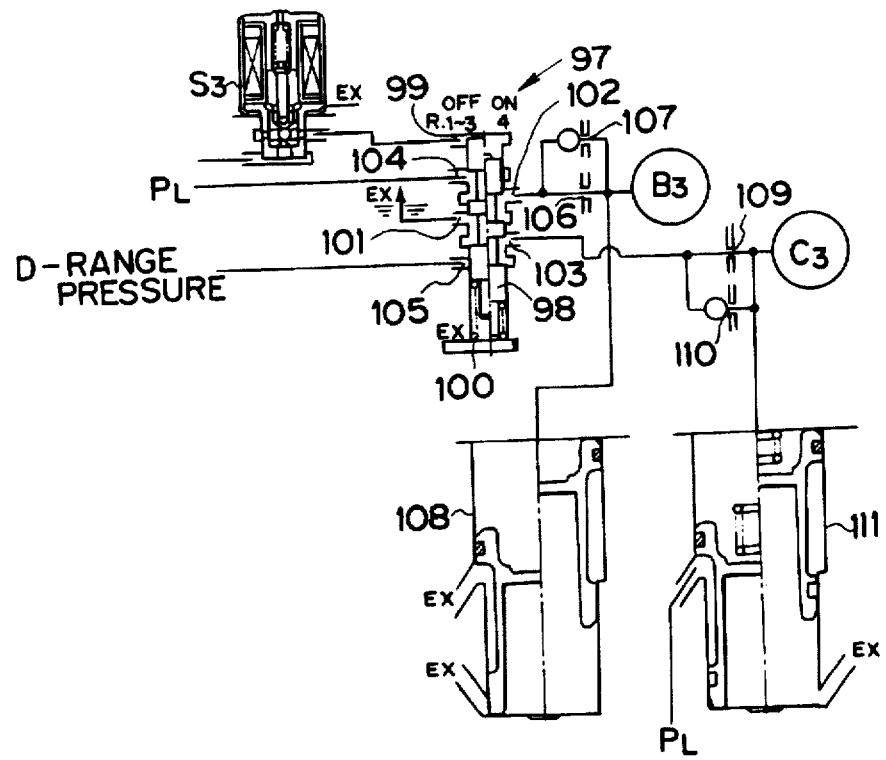
FIG. 9 is a diagram showing such a portion of the hydraulic circuit, as relates to a third clutch and a third brake.

FIG. 9 shows a hydraulic circuit for controlling the frictional engagement devices in the second transmission unit 12. The third clutch C3 and the third brake B3 in the second transmission unit 12 are switched such that while one of them is applied the other is released. For this operation, a 3–4 shift valve 97 switches the feed of the D-range pressure to the third clutch C3 and the feed of the line pressure PL to the third brake B3. Specifically, the 3–4 shift valve 97 is equipped with a spool 98 having three lands of the same diameter. In one end portion of the spool 98, there is formed a control port 99, to which is connected a third solenoid valve S3. This third solenoid valve S3 is a normally closed type ON/OFF valve which outputs, if ON, the input pressure unchangedly as the signal pressure and reduces, if OFF, the signal pressure to zero. A spring 100 is arranged at the end portion opposite to that control port 99.

In the axially central portion of the 3–4 shift valve 97, moreover, there is formed a drain port 101, across which are formed a brake port 102 and a clutch port 103. Across the brake port 102 and at the side opposite to the drain port 101, there is formed a line pressure input port 104. Across the clutch port 103 and at the side opposite to the drain port 101, there is formed a D-range pressure input port 105. Specifically, when the spool 98 is pushed up to the position, as shown at the lefthand half of FIG. 9, the line pressure input port 104 communicates with the brake port 102, and the clutch port 103 communicates with the drain port 101. On the contrary, when the spool 98 is pushed down to the position, as shown at the righthand half of FIG. 9, the D-range pressure input port 105 communicates with the clutch port 103, and the brake port 102 communicates with the drain port 101.

To the brake port 102, moreover, there are connected the third brake B3 and an accumulator 108, respectively, through an orifice 106 and a check ball orifice 107 which are arranged in parallel with each other. To the clutch port 103, on the other hand, there are connected the third clutch C3 and an accumulator 111, respectively, an orifice 109 and a check ball orifice 110 which are arranged in parallel with each other.

As described above, each frictional engagement device is fed with the line pressure PL or the D-range pressure, which is outputted as the unregulated line pressure PL from the manual valve, so that it is applied. As a result, the torque capacity of the frictional engagement device is determined substantially by the line pressure PL. This line pressure PL is regulated by a primary regulator valve 112 shown in FIG. 10. This primary regulator valve 112 is equipped with spool 13 having a plurality of lands of different face areas. Of these, the land, as located at the lower end of FIG. 10, has the largest diameter, and a spring 114 is arranged on the lower side, as located in FIG. 10, of this largest-diameter land. On the other hand, a signal pressure port 115 is formed in the position wherein the spring 114 is arranged.

Figure 10:
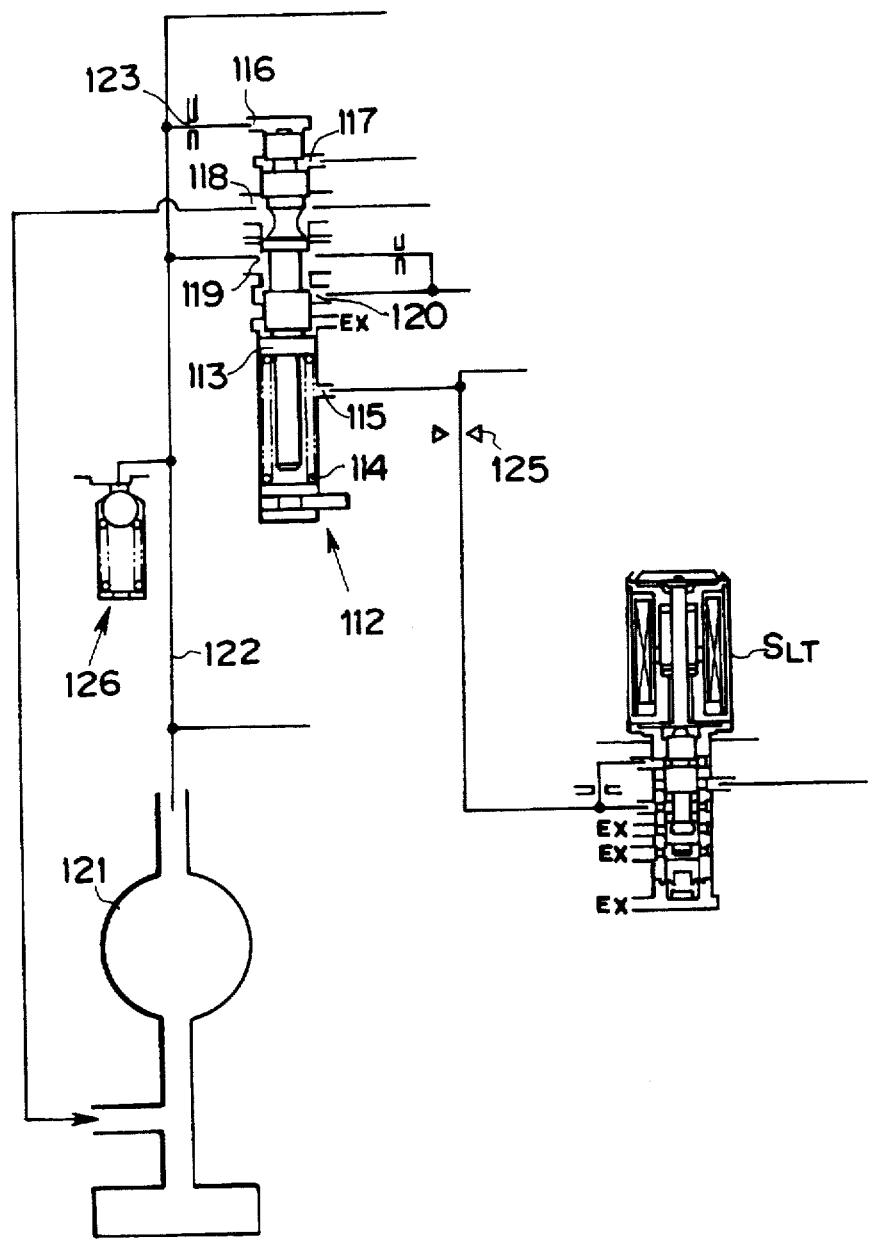
FIG. 10 is a diagram showing such a portion of the hydraulic circuit, as relates to a line pressure regulating mechanism.

The land of the upper end, as located in FIG. 10, of the aforementioned spool 113, is given the smallest external diameter, and a feedback port 116 is opened in the end face of the smallest-diameter land. Moreover, a control port 117 is opened in the lower side of that smallest-diameter land, and a drain port 118 is opened in the lower side of the land, as located in the second order downward of FIG. 10. The portion facing that drain port 118 is constricted into an hourglass having a valley of a gradually reduced diameter at the axially central portion. At the lower side, as located in FIG. 10, of the hourglass, there is formed across a land another hourglass having a stepped valley, which is faced by an input port 119. An output port 120 is formed at the lower side, as located in FIG. 10, of the input port 119.

The discharge port of an oil pump 121, as driven by the not-shown engine, is connected through a line pressure passage 122 to the input port 119 of the primary regulator valve 112 and further through an orifice 123 to the feedback port 116. To the signal pressure port 115 opened in the portion where the spring 114 is arranged, on the other hand, there is connected through an orifice 125 a normally open type solenoid valve SLT. This solenoid valve SLT is a valve which is subjected to a duty control to output a throttle pressure in accordance with the engine load (e.g., the throttle opening), and is constructed to output the highest throttle pressure, when the duty ratio is 0% (i.e., OFF) and to reduce the throttle pressure to zero when the duty ratio is 100% (i.e., ON).

In the primary regulator valve 112, therefore, the discharge pressure of the oil pump 121 acts upon the feedback port 116. When the load, directed downward of FIG. 10 on the basis of the discharge pressure, exceeds the sum of the elastic force of the spring 114 and the pressure based upon the throttle pressure acting upon the signal pressure port 115, the spool 113 is pushed downward of FIG. 10. When the spool 113 is thus moved, the input port 119 acquires communication with the drain port 118 so that the oil pressure acting upon the input port 119, i.e., the discharge pressure of the oil pump 121 is drained off. The oil pressure to act upon the feedback port 116 accordingly drops so that the spool 113 is pushed upward of FIG. 10 by the elastic force of the spring 114 and the throttle pressure to cut off the communication between the input port 119 and the drain port 118. As a result, the discharge pressure of the oil pump 121 to act upon the input port 119 rises. Accordingly, the oil pressure to act upon the feedback port 116 rises again to push down the spool 113 as in the aforementioned case.

In short, the primary regulator valve 112 regulates the oil pressure of the input port 119 so as to balance the axial forces to act across the spool 113. These axial forces to act across the spool 113 grow the higher for the higher throttle pressure, that is, the pressure regulating level grows the higher in accordance with the throttle pressure so that the line pressure PL can be regulated to a proper level by controlling the solenoid valve SLT electrically to raise or lower its output pressure or the throttle pressure. Incidentally, reference numeral 126 appearing in FIG. 10 designates a relief valve.

FIG. 11 tabulates the applied/released states of the frictional engagement devices for setting the gear stages at each shift range of the automatic transmission 1 thus far described. In FIG. 11: symbols ○ indicate the applied states; symbols ⊙ indicate the application while being driven; and blanks indicate the released states. As seen from FIG. 11, the shift between the second speed and the third speed is the so-called "clutch-to-clutch shift" in which the applied/ released states of the second clutch C2 and the first brake B1 are switched together. Moreover, the second clutch C2 is applied not only at the third speed and the forth speed but also at the reverse (Rev) stage.

Figure 12:
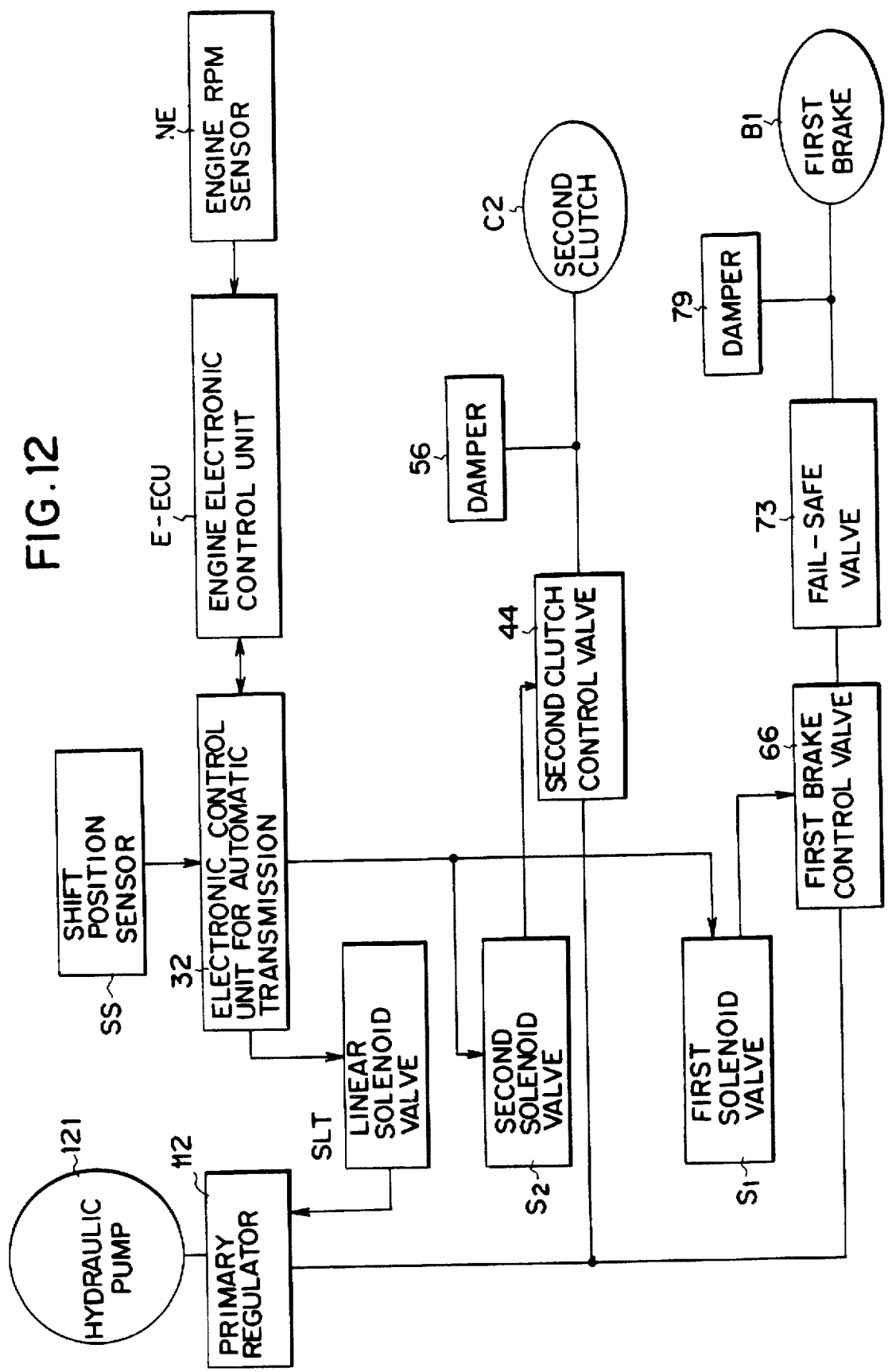
FIG. 12 is a block diagram for explaining a hydraulic circuit for the first brake and the second clutch which relate to a clutch-to-clutch shift.

Therefore, the hydraulic control circuit of the frictional engagement devices C2 and B1 of the hydraulic control unit 31 is shown in a block diagram in FIG. 12. In FIG. 12:

reference letters SS designate a shift position sensor; letters E-ECU an electronic control unit for the engine; and letters NE an engine RPM sensor. The shift position sensor SS is connected with the electronic control unit 32 for the automatic transmission, and the engine RPM sensor NE is connected with the engine electronic control unit E-ECU. Moreover, these electronic control units 32 and E-ECU are so connected as to effect data communications with each other.

In the automatic transmission 1 thus far described, the upshift from the second speed to the third speed is the clutch-to-clutch shift in which the first brake B1 is released whereas the second clutch C2 is applied. For this shift, it is desired that the first brake B1 is abruptly released at the instant when the second clutch C2 is fed with the oil pressure with the first brake B1 being applied so that the it begins to have a torque capacity, namely, to engage. This instant, at which the second clutch C2 begins to engage, disperses with the individual differences of the hydraulic circuits and the frictional engagement devices even if the oil pressure to be fed is constant. At the aforementioned upshift from the second speed to the third speed, therefore, the timing for releasing the first brake B1 has to be determined by detecting the beginning of the engagement of the second clutch C2.

However, the beginning of the engagement of the second clutch C2 cannot be directly detected. Nor is caused a change in the rotation by the second clutch C2 beginning to have the torque capacity. As a result, it is difficult to detect the beginning of the engagement of the second clutch C2 at the time of the clutch-to-clutch shift. In the control system of the present invention, therefore, the timing for the second clutch C2 to begins to engage substantially by itself at the time of executing the shift is detected, and this beginning of the second clutch C2 at the upshift from the second speed to the third speed is decided on the basis of the detection result so that the release of the first brake B1 is accordingly controlled.

Figure 1:
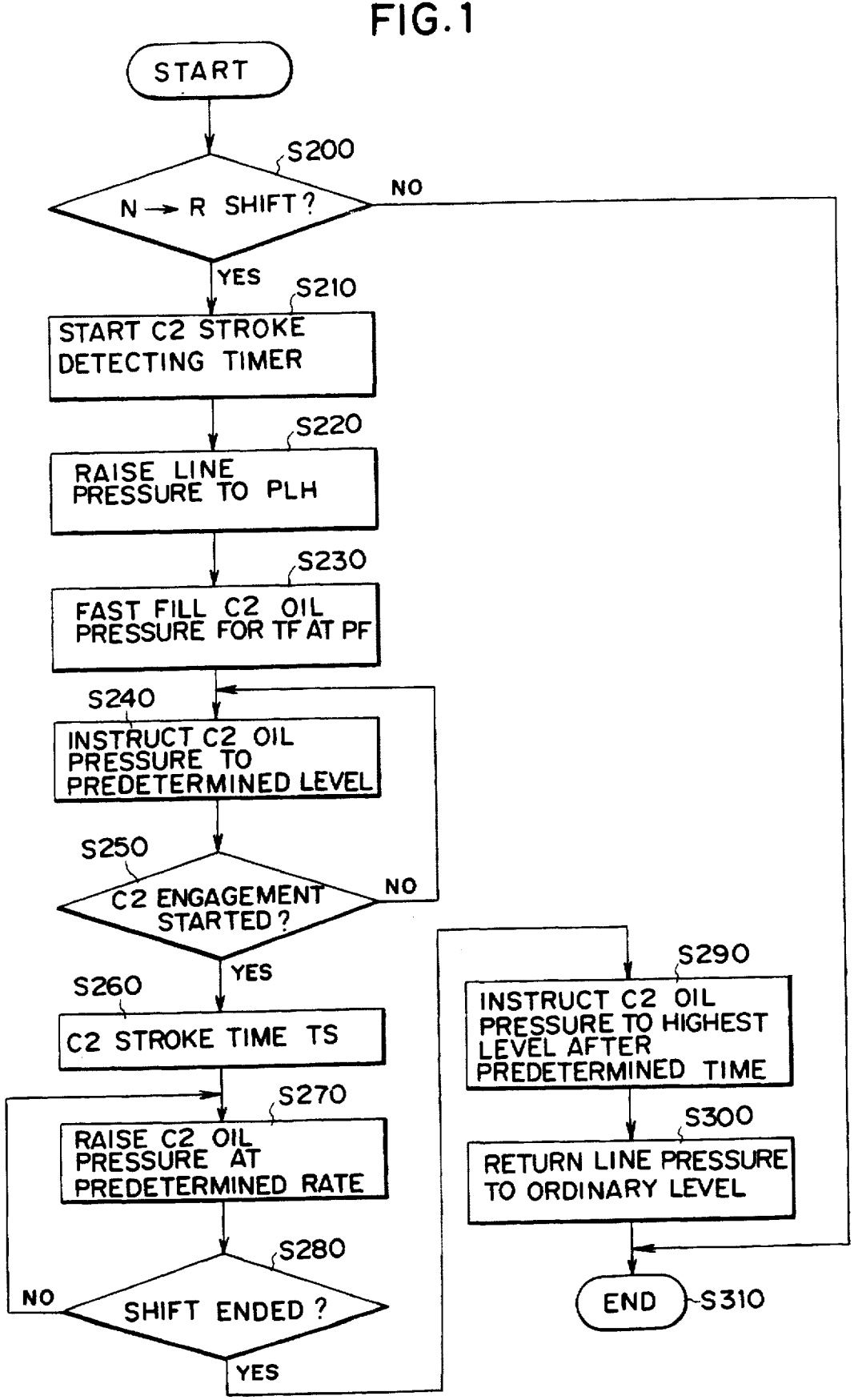
FIG. 1 is a flow chart showing a control routine for detecting a stroke time of a second clutch by a control system of the present invention.

This control will be specifically described in the following. First of all, FIG. 1 presents a control routine at the time of a shift to the reverse stage, in which the shift is controlled substantially by the second clutch C2 only. For this reverse stage, as seen from FIG. 11, not only the second clutch C2 but also the second brake B2 and the third brake B3 are applied. These brakes B2 and B3 are fed, when applied, with the oil pressure independently of the second clutch C2 so that the rotational fluctuation is caused by the engagement of the second clutch C2.

At first Step S200, therefore, it is decided whether or not a shift is effected from the neutral (N) range to the reverse (R) range. This decision is made by the automatic transmission electronic control unit 32 in terms of the detection signal of the aforementioned shift position sensor SS, as inputted to the electronic control unit 32. If the answer of Step S 200 is NO, the routine of FIG. 1 is escaped. If the shift is made to the reverse range to select the reverse stage so that the answer of Step S200 is YES, the C2 stroke detecting timer is started (at Step S210). This operation can be executed by resetting the counter to zero, for example, to start the count again. Alternatively, the start time is memorized and subtracted from the end time so that the timer can be prepared for metering the lapse time. Another alternative can use a hardware timer.

Figure 2:
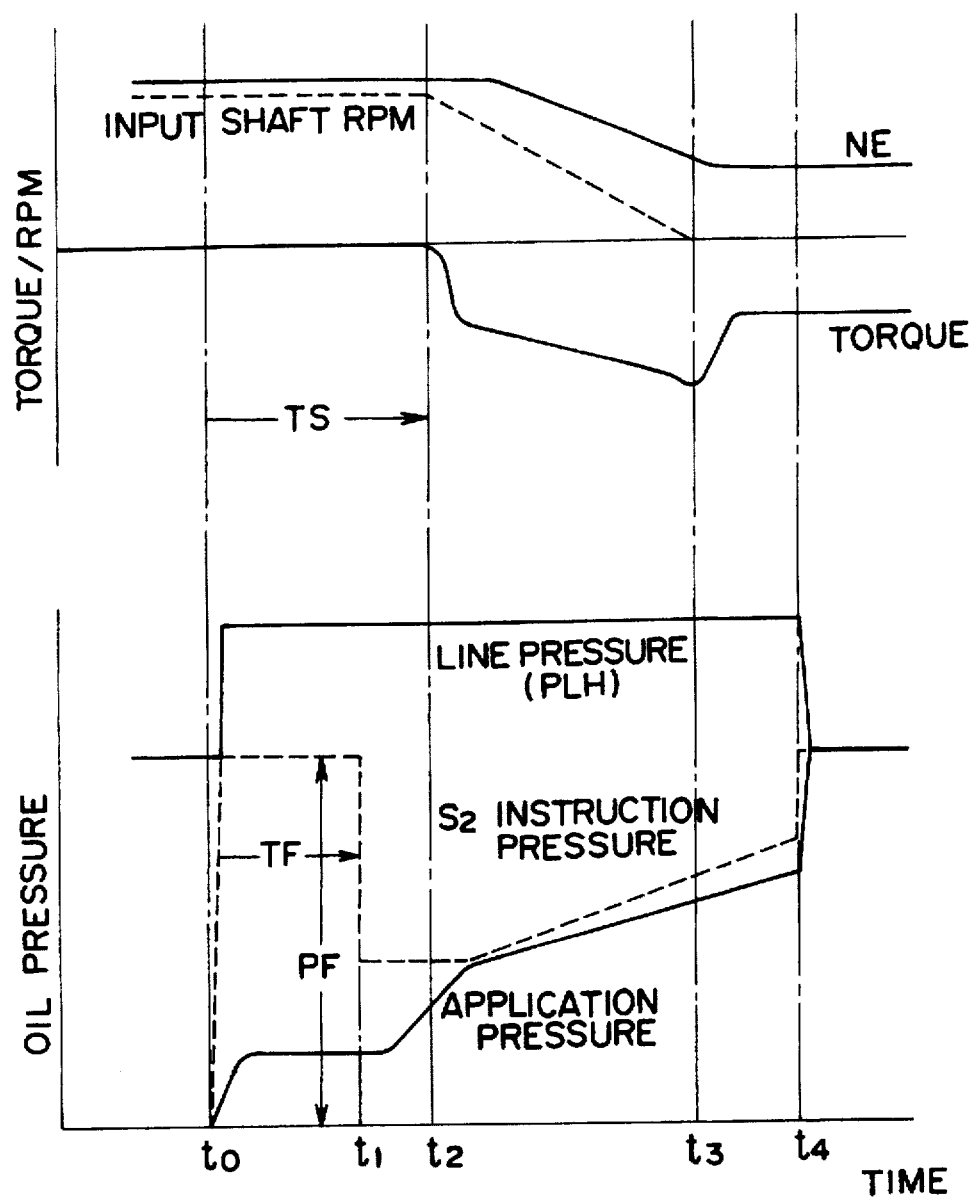
FIG. 2 is a time chart plotting the changes in the engine RPM, the output shaft torque, and the oil pressure in a frictional engagement device when the stroke time of the second clutch is to be detected at the time of setting a reverse gear.

FIG. 2 is a time chart plotting the changes in the output shaft torque and the engine RPM, and the oil pressure at the time of the shift to the reverse stage. The aforementioned start time of the C2 stroke detecting timer is indicated by t0 in FIG. 2. Simultaneously with the start of this timer, the line pressure PL is raised (at Step S220) to a level PLH which is preset as a higher pressure than that based upon the throttle opening. This control is executed by outputting a signal at a predetermined duty ratio from the aforementioned automatic transmission electronic control unit 32 to the line pressure regulating linear solenoid valve SLT to raise the signal pressure for the primary regulator valve 112. Therefore, this control corresponds to one for setting the original oil pressure to be fed to the frictional engagement device to a predetermined constant level thereby to arrange the circumstances of the oil pressure, and the means for this control corresponds to oil pressure adjusting means or line pressure adjusting means in the present invention.

Simultaneously with the rise in the line pressure PL, moreover, the pressure to be fed to the second clutch C2 is set to a predetermined level PF, which is continued (at Step S230) for a predetermined time period TF. In other words, the fast fill control is executed for the second clutch C2.

This oil pressure PF is sufficient for filling the hydraulic servo mechanism (or cylinder) of the second clutch C2 quickly with the pressure oil and is exemplified by a level as high as the line pressure based upon the throttle opening so that it is higher than the oil pressure during the shifting control of the second clutch C2. Moreover, this control can be executed by the second solenoid valve S2 shown in FIG. 7. By raising the instruction pressure of the second solenoid valve S2, more specifically, the regulation level of the second clutch control valve 44 is raised to raise the pressure to be fed to the second clutch C2. This control of raising the pressure to the second clutch C2 is one for filling the cylinder in the hydraulic servo of the second clutch C2 with the working oil to plug the so-called "packing clearance." Hence, the continuation time period TF is one just before the second clutch C2 acquires a substantial torque capacity. This time period is determined in advance on the basis of experiments. Thus, the means for the control of this Step S230 corresponds to the hydraulic adjusting means in the present invention.

At time t1 when the predetermined time period TF elapsed, the oil pressure of the second clutch C2 is lowered (at Step S240) to the level which is demanded at the instant of starting the engagement for setting the reverse. This operation can be executed by lowering the instruction pressure of the second solenoid valve S2 to lower the regulation level of the second clutch control valve 44.

After the fast fill control of Step S230, the frictional engagement devices of the second clutch C2 are forced to contact each other by feeding the a lower oil pressure to the second clutch C2 so that the second clutch C2 gradually begins to have a torque capacity of the frictional force. In other words, the torque is transmitted from the torque converter 2 to the output gear 28. At the time of setting the reverse stage, on the other hand, the vehicle is usually stopped by the foot brake or the side brake (although neither of them is shown). As the second clutch C2 or the input clutch for the reverse stage begins to have the torque capacity, the braking force acts upon the turbine runner 4 of the torque converter 2 to stop its rotation. Specifically, the RPM of the input shaft system gradually drops, as indicated by the broken curve of FIG. 2, and the engine RPM NE begins to drop slightly after. In other words, the RPM of the input shaft line such as the turbine RPM can be detected to decide that the second clutch C2 has started to engage (at Step S250).

Since a delay from the instant when the RPM of the input shaft system begins to drop to the instant when the engine RPM begins to drop is substantially constant, the time slightly before the beginning of the drop of the engine RPM can be decided to be the engagement beginning time of the second clutch C2 by detecting the engine RPM in place of the drop of the RPM of the input shaft system such as the turbine RPM.

When the beginning of the engagement of the second clutch C2 is detected in terms of the RPM change so that the answer of Step S250 is YES, a lapse time TS from time t2 to the time t0 is determined (at Step S260) as the stroke time of the second clutch C2. Thus, it is possible to determine the stroke time TS of the second clutch C2 of the case in which the predetermined time TF continues when the line pressure PL is set to the aforementioned level PLH and when the fast fill pressure for the second clutch C2 is set to the aforementioned predetermined level PF.

After the stroke time TS at Step S260 has been determined, as described above, the ordinary control is executed for setting the reverse stage. Specifically, the application pressure of the second clutch C2 is raised (at Step S270) at a predetermined rate. Accordingly, the torque capacity of the second clutch C2 is gradually increased to progress the shift so that the RPM of the input shaft system and the engine RPM NE gradually drop. The end of the shift is decided (at Step S280) while that pressure raising control is being continued.

Since the reverse stage is originally set with the braking operation being executed, as described above, the RPM of the input shaft system such as the turbine RPM is at zero when the reverse stage is set. As a result, the end of the shift to the reverse stage can be decided on the basis of the RPM of the input shaft system. Even if the RPM of the input shaft system drops to zero, on the other hand, the engine is continued to rotate by the slip of the aforementioned torque converter so that its RPM NE is stabilized at a predetermined low value. The engine RPM NE becomes stable at the low RPM with a delay of a predetermined time period from the instant when the RPM of the input shaft system drops to zero. It is, therefore, possible to decide the end of the shift on the basis of the engine RPM NE in place of the RPM of the input shaft system.

When the shift to the reverse stage is ended so that the answer of Step S280 is YES, it is instructed (at Step S290) to set the application pressure of the second clutch C2 to the highest level at time t4 a predetermined time after time t3, and the line pressure PL is returned (at Step S300) to the ordinary level on the basis of the throttle opening. Specifically, the output pressure of the second solenoid valve S2 is raised to set the instruction pressure of the second clutch control valve 44 to the highest level, and the instruction signal of the linear solenoid valve SLT is lowered to a level corresponding to the throttle opening thereby to lower the pressure regulating level of the primary modulator valve 112. Incidentally, the routine is ended at Step S310.

The stroke time TS of the second clutch C2, as detected above, is the time period from the beginning of the feed of the oil pressure to the beginning of the engagement when the fast fill is conditioned by setting the feed oil pressure at PF and the continuation time period at TF. In the example described above, the line pressure PL or the original oil pressure to be fed to the second clutch C2 is controlled to remain at the predetermined high level PHL so that it may not change with the throttle opening.

In other words, the second clutch C2 begins to engage at the instant when the aforementioned stroke time TS elapses, if the oil pressure feeding conditions are set to the level like the aforementioned one. In the control system of the present invention, therefore, the clutch-to-clutch shift for applying the second clutch C2 is controlled by making use of that stroke time period TS.

Figure 3:
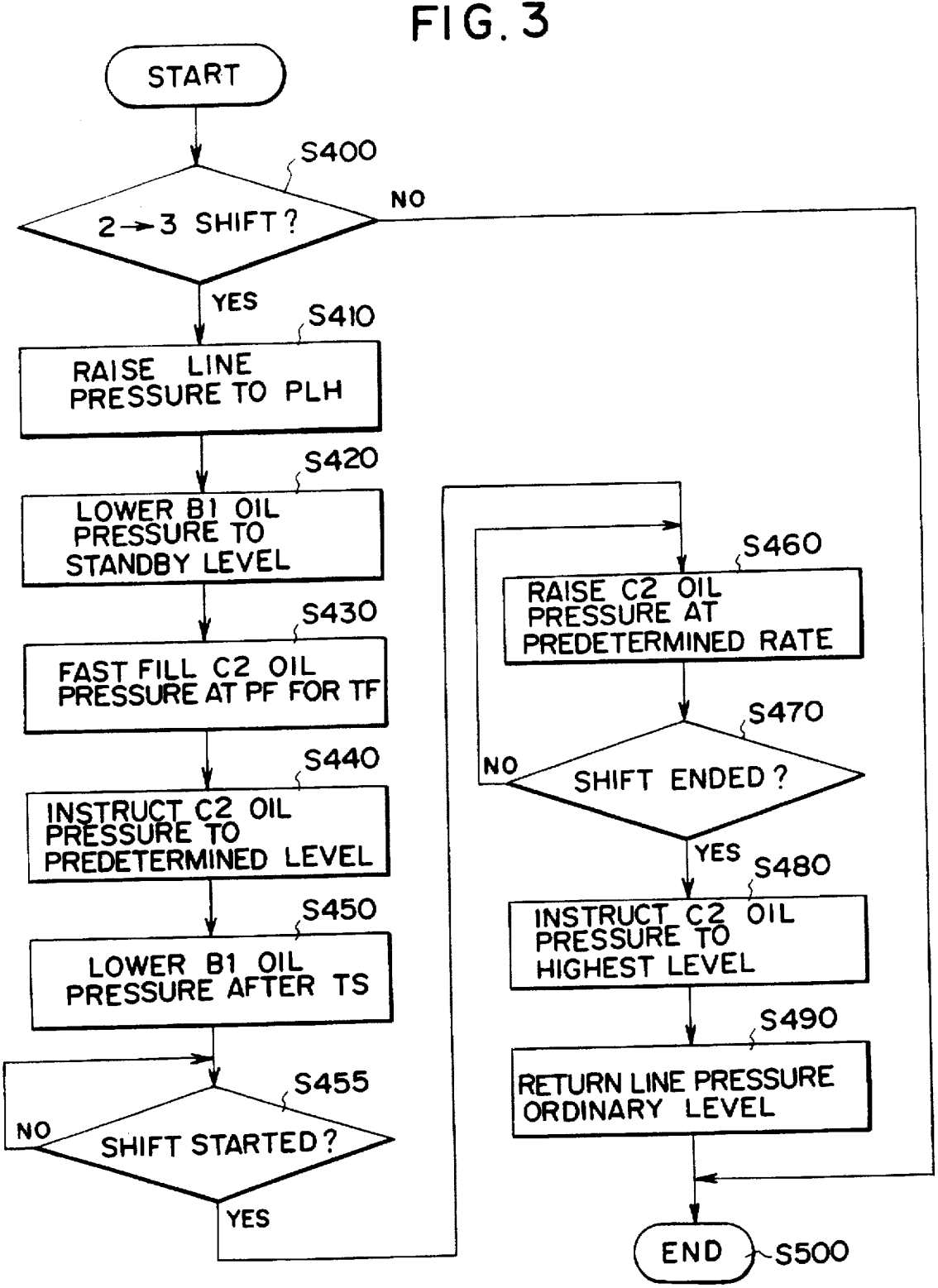
FIG. 3 is a flow chart showing a control routine of the oil pressure, as based upon the stroke time at an upshift from a second speed to a third speed.
Figure 4:
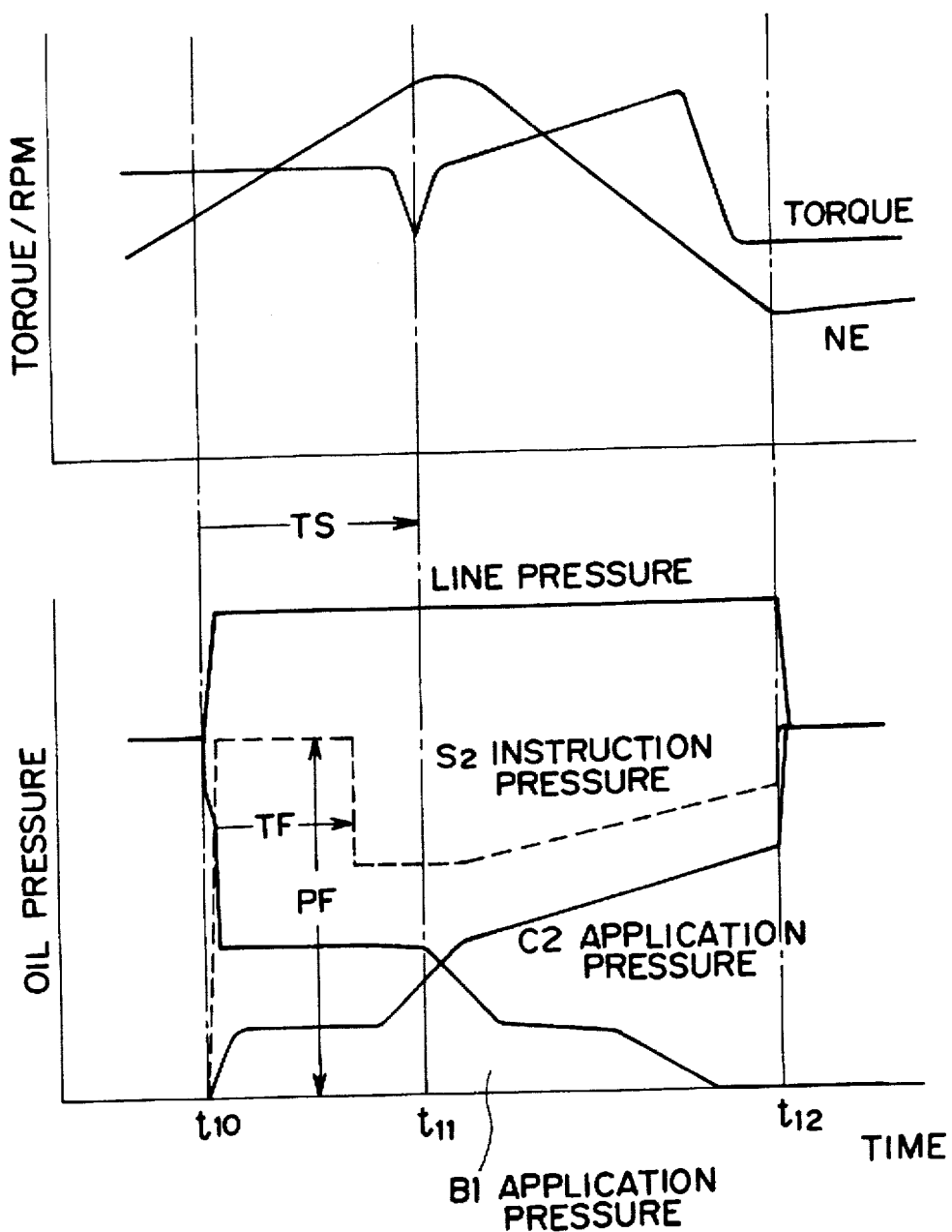
FIG. 4 is a time chart plotting the changes in the engine RPM, the output shaft torque, and the oil pressure in a frictional engagement device at the upshift from the second speed to the third speed.

FIGS. 3 and 4 show an example of the control. In the automatic transmission 1 described above, the clutch-to-clutch shift for applying the second clutch C2 is the upshift from the second speed to the third speed. At first Step S400, therefore, the upshift from the second speed to the third speed is decided. This decision is made as in the ordinary automatic transmission by the electronic control unit 32 on the basis of the vehicle speed, the throttle opening and the shift map stored in advance. If the answer of this Step S400 is NO, the routine of FIG. 3 is escaped without any controls. If the answer of Step S400 is YES, on the other hand, the line pressure PL is raised to and kept at the aforementioned predetermined pressure PLH (at Step S410). This prevents the original pressure in the hydraulic control unit 31 from changing with the throttle opening, thereby to keeps it under a constant level. This is indicated by the state of time t10 in the time chart of FIG. 4. Incidentally, the line pressure PL can be controlled by setting the duty ratio of the linear solenoid valve SLT properly, as described above, to change the pressure regulating level of the primary regulator valve 112. Thus, the means for executing the operation of Step S410 corresponds to the oil pressure adjusting means and the line pressure adjusting means of the present invention.

Simultaneously with this, the oil pressure of the first brake B1 to be applied at the upshift from the second speed to the third speed is lowered (at Step S420) to the level just before the release is started. This standby oil pressure just before the release start is at the level which is empirically determined. Incidentally, the oil pressure of this first brake B1 can be controlled by controlling the duty ratio of the first solenoid valve S1 to change the signal pressure to the first brake control valve 66 thereby to change the pressure regulating level of the first brake control valve 66.

Moreover, the second clutch C2 is subjected to the fast fill. Specifically, the feed pressure of the second clutch C2 is set to the aforementioned pressure PF and continued for the aforementioned time TF (at Step S430). Simultaneously as the time TF elapses, the oil pressure of the second clutch C2 is set to the level, as demanded for the start of engagement (at Step S440). This pressure is at the level for starting the engagement of the second clutch C2 when the aforementioned reverse stage is to be set. The control of the oil pressure of the second clutch C2 can be executed by controlling the aforementioned duty ratio of the second solenoid valve S2. Therefore, the controls of Steps S430 and S440 make the condition for the fast fill identical to the condition for feeding the oil pressure at the time of setting the aforementioned reverse stage. Thus, the means for executing this Step S430 corresponds to the oil pressure adjusting means in the present invention.

At time t11 after the stroke time TS, as obtained by the control shown in FIG. 1, has elapsed, the oil pressure of the first brake B1 is lowered (at Step S450). Specifically, the condition for the fast fill of the second clutch C2 is made identical to that for the fast fill at the time of setting the reverse stage, as controlled substantially by the second clutch C2 only, so that the second clutch C2 has already begun to engage after lapse of the stroke time TS. As a result, the so-called "grip change" from the first brake B1 to the second clutch C2 is effected by lowering the oil pressure of the first brake B1 quickly at this time to release it. In this case, the second clutch C2 has the torque capacity so that the overshoot of the engine is not caused even if the first brake B1 is released. Simultaneously as the second clutch C2 begins to have the torque capacity, the first brake B1 is released to prevent the temporary drop of the output shaft torque, which might otherwise cause the tie-up or shock. Incidentally, the torque is plotted, as if it temporarily drops, in FIG. 4, but this drop is the torque change which is usually caused according to the grip change of the frictional engagement device, so that it will not cause the shock.

After the second clutch C2 has begun to engage in place of the first brake B1, as described above, the shift to the third speed substantially begins to progress. At Step S455, therefore, it is decided whether or not the shift has been started. The start of this shift is the start of the inertia phase at the upshift from the second speed to the third speed. Hence, this start can be decided, for example, in view of the fact that the difference between the product of the gear ratio of the second speed and the input RPM (e.g., the engine RPM or the turbine RPM) and the output shaft RPM reaches a predetermined value. This occurs at the instant when the engine RPM begins to drop, as seen from FIG. 4.

When the start of the shift is detected, the oil pressure of the second clutch C2 is raised (at Step S460) at a predetermined rate. Then, the shift to the third speed progresses. At subsequent Step S470, therefore, the end of the shift is decided. This shift end can be decided on the basis of the difference between the product of the gear ratio of the third speed and the input RPM and the output shaft RPM.

The control of Step S460 is continued till the end of the shift is detected. At the instant (i.e., at time t12 of FIG. 4) when the shift end is decided, the oil pressure of the second clutch C2 is instructed to the highest level (at Step S480), and the line pressure is returned to the ordinary level based upon the throttle opening (at Step S490). Incidentally, the routine is ended at Step S500.

By controlling the upshift of the second to third speeds in accordance with the routine of FIG. 3, therefore, the first brake B1 can be released simultaneously as the second clutch C2 begins to engage. As a result, it is possible to prevent the shock due to the tie-up or the overshoot of the engine, which might otherwise be caused by the released state of the two frictional engagement devices, so that the clutch-to-clutch shift can be smoothly executed. Especially according to the control system thus far described, the stroke time TS of the second clutch C2, i.e., the time period from the start of the oil pressure feed to the start of the engagement is detected each time the reverse stage is set. Thus, the stroke time TS is always updated to the newest value so that the change in the characteristics due to the wear of the second clutch C2 can be reflected upon the stroke time TS. As a result, the clutch-to-clutch shift for applying the second clutch C2 can be smoothly executed at all times. Moreover, the stroke time TS of the second clutch C2 is detected for each automatic transmission so that the individual difference, if any in the second clutch C2, can be reflected upon the stroke time TS. Specifically, the clutch-to-clutch shift for applying it can be smoothly executed, even if the second clutch C2 has the individual difference.

Since the upshift from the second to third speeds is not executed just after the reverse stage has been set, there is a time discrepancy between the detection of the stroke time TS and the clutch-to-clutch shift, as based upon the detected stroke time TS. Moreover, the viscosity of the oil of the hydraulic control unit 31 changes with the temperature so that the responsibility of the hydraulic control unit 31 changes with the temperature. Therefore, there may be provided means for correcting the stroke time TS on the basis of the oil temperature if there is a difference between the oil temperature at the time of setting the reverse stage, that is, the oil temperature at the instant when the stroke time TS is detected, and the oil temperature at the time of executing the clutch-to-clutch shift for applying the second clutch C2.

Specifically, this correction means includes oil temperature detecting means having a sensor for detecting the oil temperature, and means for prestoring as a map the correction value which corresponds to the difference in the oil temperatures at the time of detecting the stroke time TS and at the clutch-to-clutch shift time. At the clutch-to-clutch shift time, the oil temperature detecting means invokes the correction value of the stoke time TS from the oil temperature difference, to control the release the first brake B1 or the frictional engagement device at the release side by the corrected value of the detected stroke time TS, as corrected with that correction vale.

Another cause for exerting influences upon the start to apply the frictional engagement device is the amount of oil residing in the frictional engagement device. Specifically, if the oil pressure is applied to the frictional engagement device with the oil being left in the hydraulic servo mechanism of the frictional engagement device, this device begins to engage earlier than the case in which no oil is left therein. Thus, when the stroke time TS of the second clutch C2 is to be detected, this detection is preferably conducted with the oil being sufficiently discharged from the second clutch C2. More specifically, means for detecting the duration of the neutral range is provided to detect the stroke time TS of the second clutch C2 if the time period detected by the detection means is longer than a predetermined period.

If, on the other hand, the shift for setting the third speed is made just after the drainage from the second clutch C2, the oil pressure is fed to the second clutch C2 before the oil is not sufficiently discharged from the second clutch C2. As a result, the engagement starting time of the second clutch C2 becomes earlier for the amount of oil left in the second clutch C2. Therefore, it is preferable not to execute the control of the clutch-to-clutch shift based upon the aforementioned stroke time TS, at the time of the so-called "multiple shift", in which the speed is shifted up from the second to the third before the sufficient oil is not discharged from the second clutch C2. For this, there are provided oil residual detecting means for detecting that the oil is not sufficiently discharged from the second clutch C2, and inhibition means for inhibiting the release control of the first brake B1 on the basis of the aforementioned stroke time TS if it is detected that the oil is left in the second clutch C2.

This inhibition means is replaced by stroke time correcting means for correcting the stroke time TS, if it is detected that the oil is left in the second clutch C2, so that the timing for releasing the frictional engagement device at the released side at the clutch-to-clutch shift is controlled on the basis of the corrected time.

In the aforementioned embodiment, moreover, the abrupt drainage from the first brake B1 is made simultaneously as the stroke time of the second clutch C2 elapses. However, an inevitable response delay time exists before the application pressure of the first brake B1 actually begins to drop in response to the instruction to lower the pressure of the first brake B1. Hence, the instruction to release the first brake B1 need not be simultaneous with the lapse of the stroke time TS but may be executed at the instant which is determined on the basis of the stroke time TS.

Incidentally, to detect the stroke time from the feed of the oil pressure to the start of the engagement of the second clutch C2 is to detect the rotational change in a predetermined rotary member such as the engine. The engine RPM is adopted as the change in the RPM in the embodiment thus far described. In the present invention, however, in place of the engine RPM, there can be adopted the RPM of another rotary member such as the turbine RPM or the input RPM of the automatic transmission or the RPM of the second clutch C2.

The present invention can be applied to a control system to be directed to an automatic transmission other than the foregoing one shown in FIG. 5. In the present invention, therefore, the frictional engagement device, the stroke time of which is to be detected, should not be limited to the aforementioned second clutch. On the other hand, the shift for detecting the stroke time should not to the aforementioned one to the reverse stage, but the stroke time may be detected at a suitable shift in dependence upon the construction of the automatic transmission.

Here will be generally described the advantages to be achieved in the present invention. According to the control system of the present invention, the stroke time from the start of the feed of the oil pressure to the start of the engagement of the frictional engagement device to be applied at the clutch-to-clutch shift is detected in advance at the time of a shift, in which the frictional engagement device is applied to cause a rotational change, so that the clutch-to-clutch shift is controlled on the basis of the stroke time thus determined. As a result, it is possible to prevent either the shock due to the tie-up or the overshoot of the engine in advance at the clutch-to-clutch shift.

Moreover, the condition for the oil pressure at the time of detecting the stroke time and the condition for the oil pressure at the time of the clutch-to-clutch shift are made identical so that the clutch-to-clutch shift can be controlled more accurately. Especially in the present invention, the oil pressure to be fed for the fast fill at the start of the shift and its duration are made identical at the time of detecting the stroke time and at the clutch-to-clutch shift shift so that the decision of the start of the engagement of the applied side frictional engagement device at the time of the clutch-to-clutch shift time and the accompanying control of releasing another frictional engagement device can be more accurate.

In the present invention, moreover, the line pressure at the time of detecting the stroke time and at the clutch-to-clutch shift time is raised to the predetermined constant level so that the stroke time can be detected without being influenced by the change in the throttle opening and so that the clutch-to-clutch shift can be accurately controlled.

If, on the other hand, the stroke time is corrected on the basis of the oil temperature or the residual of the oil, the discrepancy between the decision of the start of the engagement of the frictional engagement device on the basis of the stroke time and the start of the actual engagement of the frictional engagement device can be eliminated to control the clutch-to-clutch shift more accurately.

What is claimed is:

1. A shift control system for an automatic transmission to execute a clutch-to-clutch shift by applying a first frictional engagement element and releasing a second frictional engagement element and another shift by applying said first frictional engagement element to cause a rotational change in a predetermined rotary member, comprising:

stroke time detecting means for detecting, at a shift other than said clutch-to-clutch shift, a stroke time to be taken from the feed of an oil pressure to said first frictional engagement element to the start of the engagement; and clutch-to-clutch shift control means for controlling said clutch-to-clutch shift on the basis of the stroke time which is detected by said stroke time detecting means.

2. A shift control system for an automatic transmission according to claim 1, further comprising oil pressure adjusting means for making identical the condition for feeding the oil pressure at the time of detecting said stroke time before said first frictional engagement element begins to engage, and the condition for feeding the oil pressure to said first frictional engagement element at the time of said clutch-to-clutch shift before said first frictional engagement element begins to engage.

3. A shift control system for an automatic transmission according to claim 2, wherein said oil pressure adjusting means includes means for keeping the oil pressure to be fed to said first frictional engagement element, at a predetermined level for a predetermined constant time period.

4. A shift control system for an automatic transmission according to claim 3, wherein said oil pressure adjusting means further includes line pressure adjusting means for keeping an original pressure for controlling each of said frictional engagement devices at a predetermined constant level.

5. A shift control system for an automatic transmission according to claim 4, wherein said line pressure adjusting means further includes means for keeping said original pressure at a constant level higher than the pressure which is determined on the basis of a throttle opening.

6. A shift control system for an automatic transmission according to claim 2, wherein said clutch-to-clutch shift control means includes release control means for controlling the release of said second frictional engagement element at the time of said clutch-to-clutch shift on the basis of said stroke time.

7. A shift control system for an automatic transmission according to claim 6, wherein said release control means includes means for instructing the release of said second frictional engagement element when said stroke time elapses.

8. A shift control system for an automatic transmission according to claim 6, wherein said release control means includes means for instructing the release of said second frictional engagement element when there elapses the time which is corrected from said stroke time by the response delay type of said second frictional engagement element.

9. A shift control system for an automatic transmission according to claim 6, wherein said release control means includes means for instructing the release of said second frictional engagement element when there elapses the time which is corrected from said stroke time on the basis of an oil temperature.

10. A shift control system for an automatic transmission according to claim 6, wherein said release control means includes means for instructing the release of said second frictional engagement element when there elapses the time which is corrected from said stroke time on the basis of the fact that oil is left in said first frictional engagement element.

11. A shift control system for an automatic transmission according to claim 1, wherein said clutch-to-clutch shift includes an upshift at a forward gear stage, and wherein said another shift includes a shift from a neutral state to a reverse stage.

12. A shift control system for an automatic transmission according to claim 11, further comprising means for detecting the duration of said neutral state, wherein said stroke detecting means detects said stroke time if the duration of said neutral state exceeds a predetermined time period.

13. A shift control system for an automatic transmission according to claim 1, further comprising means for detecting the residual of oil in said first frictional engagement element, wherein said stroke time detecting means detects said stroke time if no oil is left in said first frictional engagement element.

* * * * *